United States Patent
Fu et al.

(10) Patent No.: US 12,323,243 B2
(45) Date of Patent: Jun. 3, 2025

(54) DATA TRANSMISSION METHOD, TERMINAL DEVICE, NETWORK DEVICE, AND STORAGE MEDIUM

(71) Applicant: GUANGDONG OPPO MOBILE TELECOMMUNICATIONS CORP., LTD., Guangdong (CN)

(72) Inventors: Zhe Fu, Guangdong (CN); Jing Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 549 days.

(21) Appl. No.: 17/514,170

(22) Filed: Oct. 29, 2021

(65) Prior Publication Data

US 2022/0052787 A1 Feb. 17, 2022

Related U.S. Application Data

(63) Continuation of application No. PCT/CN2019/100667, filed on Aug. 14, 2019.

(51) Int. Cl.
*H04L 1/08* (2006.01)
*H04W 72/04* (2023.01)
*H04W 72/0446* (2023.01)

(52) U.S. Cl.
CPC ............ *H04L 1/08* (2013.01); *H04W 72/0446* (2013.01)

(58) Field of Classification Search
CPC .............................. H04L 1/08; H04W 72/0446
USPC .......................................................... 370/336
See application file for complete search history.

(56) References Cited

U.S. PATENT DOCUMENTS

| 2019/0075589 A1 | 3/2019 | Jeon et al. | |
| 2019/0082450 A1* | 3/2019 | Ying | H04L 1/1812 |
| 2019/0149365 A1* | 5/2019 | Chatterjee | H04L 25/0226 370/329 |
| 2020/0100279 A1* | 3/2020 | Al-Imari | H04L 5/0092 |

(Continued)

FOREIGN PATENT DOCUMENTS

| CN | 108023684 A | 5/2018 |
| CN | 108207032 A | 6/2018 |

(Continued)

OTHER PUBLICATIONS

U.S. Appl. No. 62/806,426, filed Feb. 15, 2019.*

(Continued)

*Primary Examiner* — Faisal Choudhury
(74) *Attorney, Agent, or Firm* — PERKINS COIE LLP

(57) ABSTRACT

A data transmission method, including: a terminal device determining a target location according to a repetition transmission location of a configured-grant resource having a repetition transmission configuration; and the terminal device starting to transmit data on the basis of the target location, wherein the target location is determined in one of the following manners: the target location is agreed upon by the terminal device and a network device in advance, or the target location is indicated by the network device, or the target location is decided by the terminal device, where if the target location is decided by the terminal device, the terminal device reports the target location to the network device. Further disclosed are a terminal device, a network device, and a storage medium.

11 Claims, 7 Drawing Sheets

(56) References Cited

U.S. PATENT DOCUMENTS

| | | | |
|---|---|---|---|
| 2021/0051672 A1* | 2/2021 | Rastegardoost | H04W 74/006 |
| 2021/0274527 A1* | 9/2021 | Nakamura | H04L 5/0044 |
| 2021/0282137 A1* | 9/2021 | Wang | H04W 72/23 |
| 2022/0022208 A1* | 1/2022 | Nakamura | H04L 27/2662 |
| 2022/0077963 A1* | 3/2022 | Salim | H04L 1/189 |
| 2022/0132555 A1* | 4/2022 | Blankenship | H04W 72/23 |
| 2022/0295519 A1* | 9/2022 | Takahashi | H04L 5/0044 |

FOREIGN PATENT DOCUMENTS

| | | |
|---|---|---|
| CN | 110035519 A | 7/2019 |
| JP | 2021505084 A | 2/2021 |

OTHER PUBLICATIONS

Oral Proceedings of the European application No. 19941576.1, issued on Sep. 8, 2023. 6 pages.

First Office Action of the Vietnamese application No. 1-2021-08142, issued on Sep. 25, 2023. 3 pages with English translation.

NTT Docomo et al: "Enhanced UL transmission with configured grant for URLLC" 3GPP Draft; R1-1900974 3GPP, vol. RAN WG1, No. Taipei; Jan. 21, 2019-Jan. 25, 2019 Jan. 20, 2019(Jan. 20, 2019), XP051593819. 13 pages.

Office Action of the Indian application No. 202127055751, issued on Apr. 12, 2022. 5 pages with English translation.

Supplementary European Search Report in the European application No. 19941576.1, mailed on Mar. 3, 2022. 9 pages.

VIVO: "Enhanced UL grant-free transmission for URLLC", 3GPP Draft; R1-1810397 3GPP, vol. RAN WG1, No. Chengdu, China;2Oct. 8, 2018-Oct. 12, 2018 Sep. 29, 2018 (Sep. 29, 2018), XP051517806. 8 pages.

Written Opinion of the International Search Authority in the international application No. PCT/CN2019/100667, mailed on Apr. 24, 2020. 7 pages with English translation.

3GPP TSG-RAN WG2 Meeting #106 R2-1905761, Reno, USA, May 13-17, 2019, Source: vivo, Title: Prioritization between Overlapping Configured Grants, Agenda Item: 11.7.3, Document for: Discussion and Decision.

3GPP TSG RAN WG1 Meeting #95 R1-1813223, Spokane, USA, Nov. 12-16, 2018, Agenda Item: 7.2.2.4.4, Source: InterDigital Inc., Title: Configured Grant Enhancements in NR-U, Document for: Discussion and Decision.

3GPP TS 38.214 V16.3.0 (Sep. 2020), 3rd Generation Partnership Project; Technical Specification Group Radio Access Network; NR; Physical layer procedures for data(Release 16).

International Search Report in the international application No. PCT/CN2019/100667, mailed on Apr. 24, 2020.

First Office Action of the European application No. 19941576.1, issued on Nov. 25, 2022. 5 pages.

Huawei, HiSilicon, "System-level evaluations on sidelink for NR V2X with 2Rx and 4Rx", 3GPP TSG RAN WG1 Meeting #96bis R1-1905761, Xi'an, China, Apr. 8-12, 2019. 3 pages.

First Office Action of the Chinese application No. 202111109170.X, issued on Jan. 5, 2023. 12 pages with English translation.

Decision of Refusal of the Japanese application No. 2021-577454, issued on Dec. 8, 2023. 6 pages with English translation.

Hearing Notice of the Indian application No. 202127055751, issued on Jan. 25, 2024. 2 pages with English translation.

Second Office Action of the European application No. 19941576.1, issued on May 11, 2023. 4 pages.

First Office Action of the Japanese application No. 2021-577454, issued on Jul. 4, 2023. 9 pages with English translation.

NTT Docomo, Inc., "Summary of 7.2.6.6 Enhanced UL configured grant transmission", 3GPP TSG RAN WG1 Meeting #97, R1-1907662, May 13-17, 2019. 40 pages.

Ericsson, "Initial Transmission Opportunity in UL Configured Grant",3GPP TSG RAN WG1 Meeting #97 R1-1906106, May 13-17, 2019. 4 pages.

Vivo, "Enhanced UL configured grant transmissions for URLLC", 3GPP TSG RAN WG1 #97, R1-1906151, May 13-17, 2019. 7 pages.

Samsung, "UL configured grants for eURLLC", 3GPP TSG RAN WG1 #97, R1-1906960, May 13-17, 2019. 5 pages.

Telephone Consultation of the European application No. 19941576.1, issued on Mar. 2, 2024. 2 pages.

Result of consultation of the European application No. 19941576.1, issued on Mar. 6, 2024. 3 pages.

First Office Action of the Korean application No. 10-2022-7000554, issued on Jul. 23, 2024. 15 pages with English translation.

First Office Action of the Australian application No. 2019461555, issued on Jan. 3, 2025, 3 pages.

* cited by examiner

DATA TRANSMISSION METHOD, TERMINAL DEVICE, NETWORK DEVICE, AND STORAGE MEDIUM

CROSS-REFERENCE TO RELATED APPLICATIONS

The present disclosure is a U.S. continuation application of International Application No. PCT/CN2019/100667, filed on Aug. 14, 2019. The contents of the International Application No. PCT/CN2019/100667 is incorporated herein by reference in their entirety.

BACKGROUND

The 3rd Generation Partnership Project (3GPP) Radio Access Network (RAN) working group approved and initiated a project of New Radio (NR) in Unlicensed (NR-U) in December 2018. An objective of the project is to enable NR to work in an unlicensed band. For Configured Grant (CG) resources configured in the unlicensed band of NR, the concept of repetition is introduced. For a CG resource, resource positions for multiple transmissions may be configured to transmit data of the same generated Media Access Control (MAC) Protocol Data Unit (PDU). However, how to ensure that a network device may accurately parse data transmitted by a terminal device based on a CG resource configured with a repetition is a problem to be solved.

SUMMARY

The disclosure relates to a mobile communication technology, and particularly to a data transmission method, a terminal device, a network device, and a storage medium.

For solving the foregoing technical problem, embodiments of the disclosure provide a data transmission method, a terminal device, a network device, and a storage medium.

According to a first aspect, the embodiments of the disclosure provide a data transmission method, which may include the following operations.

A terminal device determines a target position according to repetition positions of a CG resource configured with a repetition.

The terminal device starts transmitting data based on the target position.

A determination manner for the target position may include one of following: predetermining by the terminal device and a network device, indicating by the network device, or determining by the terminal device. Under the condition that the determination manner is determining by the terminal device, the terminal device may report the target position to the network device.

According to a second aspect, the embodiments of the disclosure provide a data transmission method, which may include the following operations.

A network device determines a target position according to repetition positions of a CG resource configured with a repetition.

The network device starts merging data transmitted through the CG resource based on the target position.

A determination manner for the target position may include one of following: predetermining by a terminal device and the network device, determining by the network device, or reporting by the terminal device. Under the condition that the determination manner is determining by the network device, the network device may indicate the target position to the terminal device.

According to a third aspect, the embodiments of the disclosure provide a terminal device, which may include a first determination unit and a transmission unit.

The first determination unit may be configured to determine a target position according to repetition positions of a CG resource configured with a repetition.

The transmission unit may be configured to start transmitting based on the target position.

A determination manner for the target position may include one of following: predetermining by the terminal device and a network device, indicating by the network device, or determining by the terminal device. Under the condition that the determination manner is determining by the terminal device, the terminal device may report the target position to the network device.

According to a fourth aspect, the embodiments of the disclosure provide a network device, which may include a second determination unit and a merging unit.

The second determination unit may be configured to determine a target position according to repetition positions of a CG resource configured with a repetition.

The merging unit may be configured to start merging data transmitted through the CG resource based on the target position.

A determination manner for the target position may include one of following: predetermining by a terminal device and the network device, determining by the network device, or reporting by the terminal device. Under the condition that the determination manner is determining by the network device, the network device may indicate the target position to the terminal device.

According to a fifth aspect, the embodiments of the disclosure provide a terminal device, which may include a processor and a memory configured to store a computer program capable of running in the processor, the processor being configured to run the computer program to execute the operations of the data transmission method executed by the terminal device.

According to a sixth aspect, the embodiments of the disclosure provide a network device, which may include a processor and a memory configured to store a computer program capable of running in the processor, the processor being configured to run the computer program to execute the operations of the data transmission method executed by the network device.

According to a seventh aspect, the embodiments of the disclosure provide a storage medium, which may store an executable program, the executable program being executed by a processor to implement the data transmission method executed by the terminal device.

According to an eighth aspect, the embodiments of the disclosure provide a storage medium, which may store an executable program, the executable program being executed by a processor to implement the data transmission method executed by the network device.

DETAILED DESCRIPTION

Figure 1:
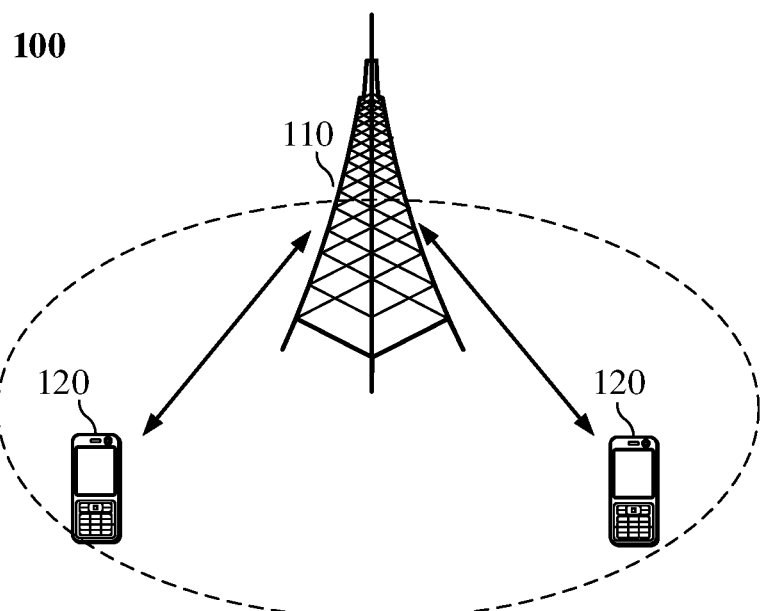
FIG. 1 is a composition structure diagram of a communication system according to embodiments of the disclosure.

The data transmission method provided in the embodiments of the disclosure includes that: the terminal device determines the target position for starting transmitting the data in one of the following manners: predetermining by the terminal device and the network device, indicating by the network device, or determining by the terminal device and reporting to the network device as required, and then the network device may know the position where the terminal device starts transmitting the data in the CG resource configured with the repetition, so that the problem that the network device merges an interference to a buffer area for practical transmission by the terminal device due to existence of multiple possible resource merging positions, which causes reduction in a merging gain and even incorrect decoding of the network device, is solved.

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Before a data transmission method provided in the embodiments of the disclosure is described in detail, a CG resource and repetition will be briefly described respectively at first.

Transmission of services such as industrial automation, transmission automation, and smart power in a 5G system is required to be supported in the 5th-Generation (5G) Industrial Interest of Things (IIoT). Based on transmission requirements of these services on latency and reliability, the concept of Time Sensitive Network (TSN) or Time Sensitive Communication (TSC) is introduced to the IIoT for a purpose of providing a support for transmission of a TSN service or an IIoT service in a 5G network. Under the TSN, a service with high reliability and low-latency is required to be supported. Requirements of the TSN service on the reliability and the latency may be as shown in Table 1.

TABLE 1

| Conditions | 1 | 2 | 3 |
|---|---|---|---|
| UE amount | 20 | 50 | 100 |
| Transmission validity | 99,9999% to 99,999999% | 99,9999% to 99,999999% | 99,9999% to 99,999999% |
| Transmission period | 0.5 ms | 1 ms | 2 ms |
| Allowable latency | Less than or equal to the transmission period | Less than or equal to the transmission period | Less than or equal to the transmission period |
| Time to live | Transmission period | Transmission period | Transmission period |
| Data packet size | 50 bytes | 40 bytes | 20 bytes |
| Service area | 15 m × 15 m × 3 m | 10 m × 5 m × 3 m | 100 m × 100 m × 30 |
| Traffic periodicity | Periodic | Periodic | Periodic |
| Use cases | Motion control and control-to-control use cases | Motion control and control-to-control use cases | Motion control and control-to-control use cases |

Since a typical service of IIoT is a deterministic periodic service, for reducing a Physical Downlink Control Channel (PDCCH) overhead, solving a PDCCH receiving reliability problem, and avoiding PDCCH receiving power loss, a semi-persistent scheduling manner may be used for resource scheduling or configuration transmission of such a service. For example, a CG is used.

NR may work in an unlicensed band. Here, the unlicensed band where NR works is called NR in Unlicensed (NR-U). NR-U may include the following scenarios.

Scenario A is a carrier aggregation scenario where a Primary Cell (PCell) works in a licensed spectrum and a Secondary Cell (SCell) working in an unlicensed spectrum is aggregated in a carrier aggregation manner.

Scenario B is a dual connectivity working scenario where a PCell works in a Long Term Evolution (LTE) licensed spectrum and a Primary Secondary Cell (PScell) works in an NR unlicensed spectrum.

Scenario C is an independent working scenario where NR works in an unlicensed spectrum as an independent cell.

Scenario D is an NR single-cell scenario where an Uplink (UL) works in a licensed spectrum and a Downlink (DL) works in an unlicensed spectrum.

Scenario E is a dual connectivity working scenario where a PCell works in an NR licensed spectrum and a PScell works in an NR unlicensed spectrum.

A working band of NR-U may be a 5 GHz unlicensed spectrum and a 6 GHz unlicensed spectrum. In the unlicensed spectrums, design of NR-U should ensure the fairness with other systems that have already worked in these unlicensed spectrums, for example, Wireless Fidelity (WiFi). The principle of fairness is that an influence of NR-U on the systems (for example, WiFi) that have already been deployed on the unlicensed spectrums should not exceed influences between these systems.

NR supports two types of CGs, i.e., a first-type CG and a second-type CG.

For the first-type CG, a UL grant is provided by Radio Resource Control (RRC), and the UL CG is activated when configured.

For the second-type CG, a UL grant is provided by a PDCCH, and the configured UL grant is activated or released based on layer-1 signaling that instructs the configured UL CG to be activated or deactivated.

For ensuring high reliability, when a CG is configured, the concept of repetition is introduced. For a CG resource, resource positions for multiple transmissions may be configured to transmit data of the same generated MAC PDU. In an RRC protocol, at least a repetition count (repK), a Redundancy Version (RV) number (repK-RV) for repetition, etc., are required to be indicated. When repetition is configured, a terminal device may start transmitting data using the resource only from a resource position corresponding to RV 0.

For example, if the repetition count is 4, and corresponding RVs are 0, 2, 3, and 1 from the front to the back, the terminal device starts transmitting a MAC PDU from a position corresponding to RV 0. A network device starts resource merging, namely merging data on the resource, from the position corresponding to RV 0 to obtain a merging gain.

For example, if the repetition count is 4, and corresponding RV numbers are 0, 3, 0, and 3 from the front to the back, the terminal device starts transmitting the MAC PDU from any one of resource positions corresponding to RV 0. The terminal device starts resource merging from the position corresponding to RV 0 to obtain the merging gain. The network device may start data merging from the repetition corresponding to the first RV number 0, or may start data merging from the repetition corresponding to the second RV number 0. Under the condition that the network device starts data merging from the repetition corresponding to the first RV number 0, the network device merges data of four positions. Under the condition that the network device starts data merging from the repetition corresponding to the second RV number 0, the network device merges the data of two positions.

In the related art, under the condition of configuring repetition, for each CG resource, multiple positions corresponding to RV 0 may be configured. If resource merging is still started from any one of positions corresponding to RV 0, which may cause such a problem that the terminal device merges other information (i.e., an interference), received at a position where no data is practically transmitted, to a buffer area for practical transmission by User Equipment (UE) to cause reduction in the merging gain and even incorrect decoding of the network device.

Based on the foregoing problem, the disclosure provides a data transmission method. The data transmission method of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, or a 5G system.

Exemplarily, FIG. 1 shows a communication system 100 that the embodiments of the disclosure are applied to. The communication system 100 may include a network device 110. The network device 110 may be a device communicating with a terminal device 120 (or called a communication terminal and a terminal). The network device 110 may provide a communication coverage for a specific geographical region and communicate with terminal devices in the coverage. Optionally, the network device 110 may be a Base Transceiver Station (BTS) in the GSM or the CDMA system, or may be a NodeB (NB) in the WCDMA system, or may be an Evolutional Node B (eNB or eNodeB) in the LTE system, or may be a gNB in an NR/TG system, or may be a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a 5G network, a network device in a future evolved Public Land Mobile Network (PLMN), etc.

The communication system 100 further includes at least one terminal device 120 within the coverage of the network device 110. As used herein, the "terminal device" includes, but not limited to, a device arranged to receive/send a communication signal through a wired line connection, for example, through Public Switched Telephone Network (PSTN), Digital Subscriber Line (DSL), digital cable and direct cable connections, and/or another data connection/network) and/or through a wireless interface, for example, for a cellular network, a Wireless Local Area Network (WLAN), a digital television network like a Digital Video Broadcasting-Handheld (DVB-H) network, a satellite network and an Amplitude Modulated (AM)-Frequency Modulated (FM) broadcast transmitter, and/or another communication terminal, and/or an Internet of Things (IoT) device. The terminal device configured to communicate through a wireless interface may be called a "wireless communication terminal", a "wireless terminal", or a "mobile terminal." Examples of the mobile terminal include, but not limited to, a satellite or cellular telephone, a Personal Communication System (PCS) terminal capable of combining a cellular radio telephone and data processing, faxing and data communication capabilities, a Personal Digital Assistant (PDA) capable of including a radio telephone, a pager, Internet/intranet access, a Web browser, a notepad, a calendar and/or a Global Positioning System (GPS) receiver, and a conventional laptop and/or palmtop receiver or other electronic devices including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent, or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, a vehicle device, a wearable device, a terminal device in the 5G network, a terminal device in the future evolved PLMN, etc.

Optionally, Device to Device (D2D) communication may be performed between the terminal devices 120.

Optionally, the 5G system or the 5G network may also be called an NR system or an NR network.

FIG. 1 exemplarily shows one network device and two terminal devices. Optionally, the communication system 100 may include multiple network devices, and other numbers of terminal devices may be included in coverage of each network device. No limits are made thereto in the embodiments of the disclosure.

Optionally, the communication system 100 may further include other network entities such as a network controller, a mobility management entity, etc. No limits are made thereto in the embodiments of the disclosure.

It is to be understood that a device with a communication function in the network/system in the embodiments of the disclosure may be called a communication device. Taking the communication system 100 shown in FIG. 1 as an example, communication devices may include the network device 110 and terminal device 120 which have the communication function, and the network device 110 and the terminal device 120 may be the specific devices as described above and will not be elaborated herein. The communication devices may further include other devices in the communication system 100, for example, other network entities like a network controller, a mobility management entity, etc. No limits are made thereto in the embodiments of the disclosure.

Figure 2:
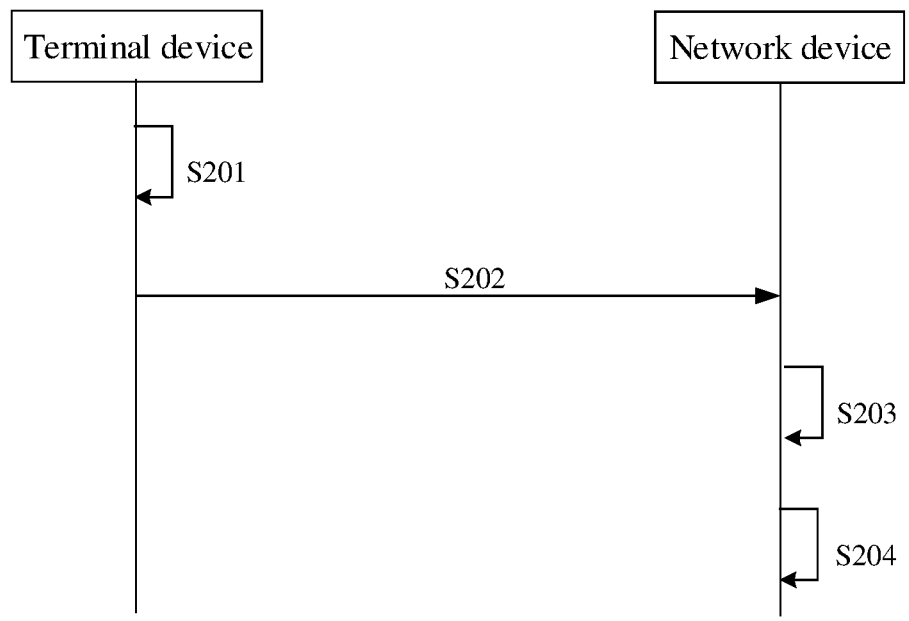
FIG. 2 is an optional schematic processing flowchart of a data transmission method according to embodiments of the disclosure.

As shown in FIG. 2, an optional processing flow of a data transmission method according to embodiments of the disclosure includes the following operations.

In S201, a terminal device determines a target position according to repetition positions of a CG resource configured with a repetition.

A network device sends configuration information of the CG resource configured for the terminal device to the terminal device through an RRC reconfiguration message. Optionally, an Information Element (IE) containing the configuration information may be ConfiguredGrantConfig.

Optionally, the configuration information, sent by the network device, of the configured CG resource includes a period, a repetition count repK, and an RV number repK-RV for the repetition. Under the condition that the configuration information includes the repetition count repK and the RV number repK-RV for the repetition, the configured CG resource is a CG resource configured with the repetition. The terminal device selects a position of one repetition from multiple repetitions of the CG resource configured with the repetition as the target position. In an example, the transmission period of the CG resource is 20 ms, the repetition count is 5, and RV numbers for all repetitions are 0, 2, 3, 1, and 2 respectively.

Optionally, the configuration information further includes a starting position of the CG resource and a type of the CG resource.

Optionally, an interval between starting positions of two adjacent repetitions of the same set of CG resource is a timeslot.

Figure 3:
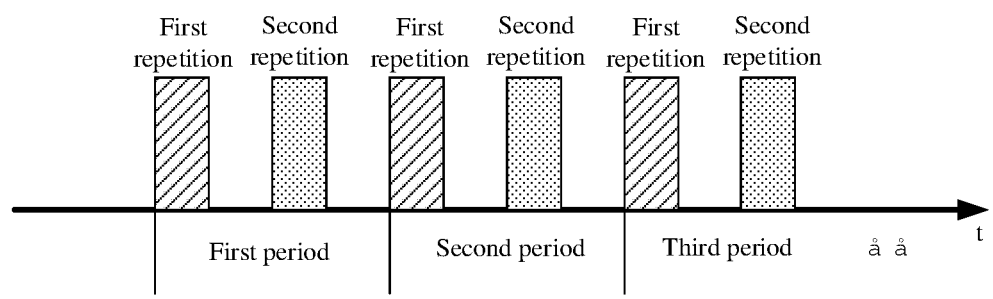
FIG. 3 is an optional schematic diagram of periodic CG resources according to embodiments of the disclosure.

In the embodiments of the disclosure, the CG resource is a periodic resource, and the CG resource of each period includes repetitions of which the count equals to the repetition count. For example, the repetition count is 2. As shown in FIG. 3, the CG resource of each period including a first period, a second period, a third period, etc., includes two repetitions. The repetition represented by the dashed area filled with lines is a first repetition, and the repetition represented by the dashed area filled with points is a second repetition.

Optionally, the CG resource configured by the network device for the terminal device is a set of CG resource. In such case, the configured CG resources have no resource conflicts, and the terminal device determines the target position for starting transmitting data based on the set of CG resource.

Optionally, the CG resource configured by the network device for the terminal device is multiple sets of CG resources. Under the condition that the multiple sets of CG resources are configured to transmit different data respectively or the multiple CG resources have no resource conflicts, the terminal device determines target positions for starting transmitting the corresponding data based on the configured multiple sets of CG resources respectively. Under the condition that the multiple sets of CG resources may be configured to transmit the same data and have resource conflicts, the terminal device selects a set of CG resource from the multiple sets of CG resources, and the target position is comprised in the selected set of CG resource.

In the embodiments of the disclosure, a determination manner for the target position includes one of the following manners.

A first manner: predetermining by the terminal device and the network device.

A second manner: indicating by the network device.

A third manner: determining by the terminal device.

In the second manner, the target position is determined by the network device, and the network device indicates the determined target position to the terminal device. Here, the network device independently determines the target position without participation of the terminal device, and indicates the determined target position to the terminal device through indication information, and the terminal device receives the target position indicated by the network device. Optionally, the network device indicates the target position to the terminal device in an indication manner of explicit indication or implicit indication.

Optionally, the indication information sent by the network device is contained in the configuration information. Optionally, the indication information sent by the network device may be contained in an RRC message such as a MAC Control Element (CE) or Downlink Control Information (DCI).

In the third manner, the target position is determined by the terminal device, and the terminal device reports the determined target position to the network device. Here, the terminal device independently determines the target position without participation of the network device, and reports the determined target position to the network device through reporting information, and the network device receives the target position reported by the network device. Optionally, the determined target position is reported to the network device in the explicit or implicit indication manner.

In the embodiments of the disclosure, for any determination manner in the abovementioned three manners, the network device may know the target position determined by the terminal device.

In the embodiments of the disclosure, when determining the target position of the CG resource configured with the repetition, the terminal device may determine corresponding target positions for different CG resources using different determination manners.

In the embodiments of the disclosure, the target position includes one of the following: a position of an Nth repetition of the CG resource, N being greater than or equal to 1; or a position of a repetition corresponding to an Mth RV number 0 in the CG resource, M being greater than or equal to 1.

For example, the target position is the position of the Nth repetition of the CG resource. In such case, the target position may be a position of a first repetition of the CG resource, or the target position may be a position of an ith repetition of the CG resource, i>1. In an example, the CG resource includes four repetitions, and the target position is a position of a first repetition. In an example, the CG resource includes four repetitions, and the target position may be a position of a third repetition.

For example, the target position is the position of the repetition corresponding to the Mth RV number 0 in the CG resource. In such case, the target position may be a position of the repetition corresponding to the first RV number 0 in the CG resource, or the target position may be a position of the repetition corresponding to the jth RV number 0 in the CG resource, j>1, or the target position may be a position of the repetition corresponding to the last RV number 0 in the CG resource. In an example, the CG resource includes four repetitions, RV numbers are 0, 3, 0, and 3 respectively, and the target position is a position of the repetition corresponding to the first RV number 0, i.e., a position of a first repetition. In an example, the CG resource includes four repetitions, RV numbers are 0, 3, 0, and 3 respectively, and the target position is a position of the repetition corresponding to the second RV number 0, i.e., a position of the third repetition. In an example, the CG resource includes four repetitions, RV numbers are 0, 3, 0, and 3 respectively, and the target position is a position of the repetition corresponding to the last RV number 0, i.e., a position of a third repetition.

Optionally, the target position is in a first transmission period. Optionally, the target position is in a second transmission period. Optionally, the target position is in any transmission period of the CG resource.

Optionally, the target position is at or after an arrival time of the data born in the CG resource.

Here, the arrival time of the data born in the CG resource is a position where the data may be born in the CG resource or which corresponds to generation time of the data in the CG resource.

For example, the target position is at the arrival time of the data born in the CG resource. In an example, the arrival time of the data born in the CG resource is the position of the first repetition of the CG resource, the target position is required to be the position of the first repetition of the CG resource, and in such case, the target position is at the arrival time of the data born in the CG resource. In an example, the arrival time of the data born in the CG resource is the position of the third repetition of the CG resource, the third repetition being a repetition corresponding to the first RV number 0, the target position is required to be the position of the repetition corresponding to the first RV number 0, and in such case, the target position is at the arrival time of the data born in the CG resource.

For example, the target position is after the arrival time of the data born in the CG resource. In an example, the arrival time of the data born in the CG resource is a position of a second repetition in the first period of the CG resource, the target position is required to be the position of a first repetition of the CG resource, and in such case, the target position is a position of a first repetition in the second period. In an example, the arrival time of the data born in the CG resource is a position of a third repetition in the first period of the CG resource, the first repetition and the third repetition being first repetitions corresponding to RV number 0, the target position is required to be the position of the repetition corresponding to the first RV number 0, and in such case, the target position is the position of the first repetition in the second period.

Optionally, the terminal device may report time information of the target position for starting transmitting the data to the network device.

In the embodiments of the disclosure, under the condition that a CG resource available for transmission of the data includes at least two sets and the at least two sets of CG resources have a resource conflict, the method further includes that: the terminal device selects a set of CG resource from the at least two sets of CG resources. Correspondingly, S201 includes that: the terminal device determines the target position from repetition positions of the selected set of CG resource.

For example, the network device configures two sets of CG resources: CG resource 1 and CG resource 2. CG resource 1 and CG resource 2 may be configured to transmit the same data and has a resource conflict. In such case, CG resource 1 or CG resource 2 is selected from CG resource 1 and CG resource 2 as a resource including the target position.

In the embodiments of the disclosure, for at least two sets of CG resources available for transmission of the same data, logical channels that may be born or services corresponding to the logical channels are the same, or logical channels with highest priorities or services corresponding to the logical channels with the highest priorities are the same.

Optionally, the terminal device may report information of the selected CG resource to the network device.

Optionally, that the at least two sets of CG resources have the resource conflict includes that the at least two sets of CG resources have overlap in a time domain.

Here, that the at least two sets of CG resources have overlap in the time domain may include one of the following conditions.

The at least two sets of CG resources are the same in configuration but different in resource starting position.

The at least two sets of CG resources are different in period, and the CG resources conflict in part of the time domain.

Figure 4:
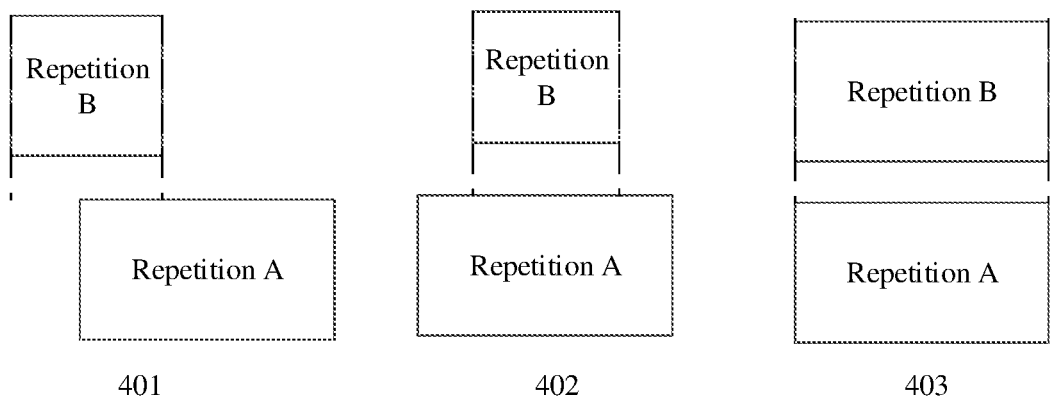
FIG. 4 is an optional schematic diagram of a time-domain overlapping effect of resources according to embodiments of the disclosure.

Taking two sets of CG resources, i.e., CG resource 1 and CG resource 2, as an example, when CG resource 1 and CG resource 2 have overlap in the time domain, one repetition or multiple repetitions of CG resource 1 have overlap with one repetition or multiple repetitions of CG resource 2 in the time domain. In an example, two repetitions, overlapping CG resource 2 in the time domain, of CG resource 1 are repetition A and repetition B respectively, and as shown in FIG. 4, time-domain positions of repetition A and repetition B include partial overlapping shown as 401, inclusion shown as 402, and complete overlapping shown as 403.

In the embodiments of the disclosure, a selection factor for selecting a set of CG resource from the at least two sets of CG resources includes at least one of following: the arrival time of the data born in the at least two sets of CG resources; and the target position of each set of CG resource.

In an example, the CG resource with a relatively short interval between the arrival time of the data and a position of a first repetition thereafter is selected from the at least two sets of CG resources. In another example, the CG resource of which the target position is earlier is selected from the at least two sets of CG resources. In another example, the CG resource with a relatively short interval between the target position and the arrival time of the data is selected from the at least two sets of CG resources.

Optionally, a selection rule for selecting a set of CG resource from the at least two sets of CG resources includes one of the following: selecting a first set of CG resource with the target position after the arrival time of the data born in the at least two sets of CG resources; or selecting a set of CG resource with a largest repetition count after the arrival time of the data born in the at least two sets of CG resources.

Figure 5:
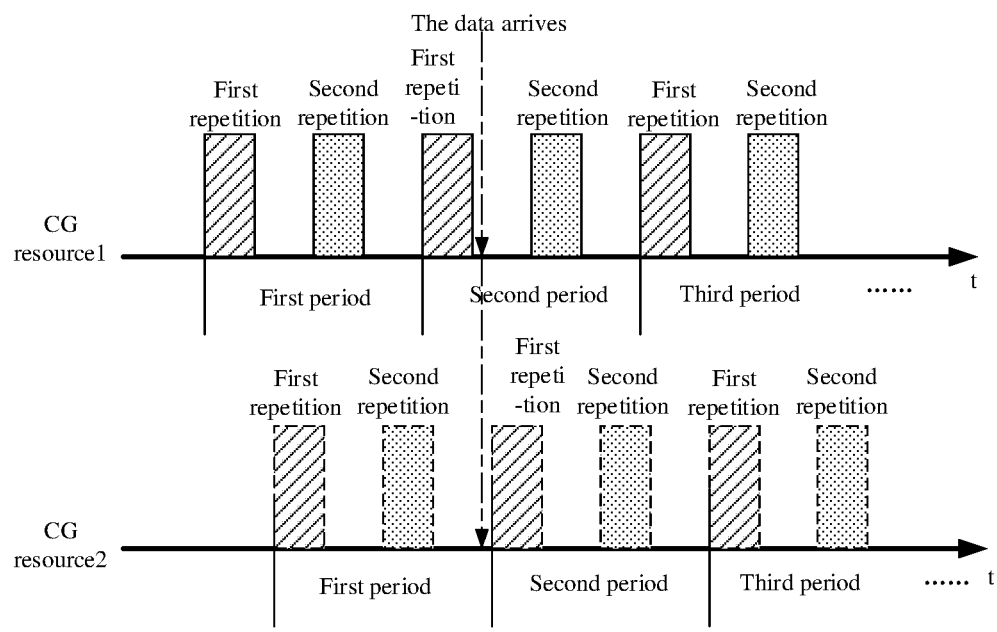
FIG. 5 is an optional schematic diagram of a target position according to embodiments of the disclosure.

For example, the selection rule is selecting the first set of CG resource with the target position after the arrival time of the data born in the at least two sets of CG resources. After the arrival time of the data, the target position of each set of CG resource is determined, and the CG resource of which the target position is closest to the arrival time of the data, i.e., the first CG resource with the target position, is determined as the selected CG resource. For example, as shown in FIG. 5, two repetitions are configured in each of CG resource 1 and CG resource 2, and target positions are positions of first repetitions. The first CG resource with the first repetition after the arrival time of the data is CG resource 2, and thus the selected CG resource is CG resource 2. In such case, the target position is a position of the first repetition in a second period of CG resource 2.

For example, the selection rule is selecting the set of CG resource with the largest repetition count after the arrival time of the data born in the at least two sets of CG resources. After the arrival time of the data, a repetition count of each set of CG resource after the arrival time of the data is determined, and the CG resource with a relatively large repetition count is determined as the selected CG resource. For example, two repetitions are configured in CG resource 1, four repetitions are configured in CG resource 2, three repetitions are configured in CG resource 3, and target positions are resources corresponding to repetition counts CGs. After the arrival time of the data, both CG2 and CG3 have CG resource positions of first repetitions. Since the number of repetition resources of CG2 is largest, the selected CG resource is CG resource 2. In such case, the target position is a position of the first repetition in a present period of CG resource 2.

In S202, the terminal device starts transmitting data based on the target position.

After determining the target position in S201, the terminal device starts transmitting the data on a CG resource having no resource conflicts based on the determined target position, or starts transmitting the data on a set of CG resource selected from multiple sets of CG resources with resource conflicts based on the determined target position.

In S203, a network device determines the target position according to the repetition position of the CG resource configured with the repetition.

Optionally, the CG resource configured by the network device for the terminal device is a set of CG resource. In such case, the configured CG resource has no resource conflicts, and the network device determines the target position for starting transmitting data based on the set of CG resource.

Optionally, the CG resource configured by the network device for the terminal device is multiple sets of CG resources. Under the condition that the multiple sets of CG resources are configured to transmit different data respectively or the multiple CG resources have no resource conflicts, the network device determines target positions for starting transmitting the corresponding data based on the configured CG resources respectively. Under the condition that the multiple sets of CG resources may be configured to transmit the same data and have resource conflicts, the network device selects a set of CG resource from the multiple sets of CG resources, and the target position is comprised in the selected set of CG resource.

In the embodiments of the disclosure, a determination manner for the target position includes one of the following manners.

A first manner: predetermining by the terminal device and the network device.

A second manner: indicating by the network device.

A third manner: determining by the terminal device.

In the third manner, the network device receives the target position reported by the terminal device.

In the embodiments of the disclosure, the target position includes one of the following.

A position of an Nth repetition of the CG resource, N being more than or equal to 1.

The position of the repetition corresponding to the Mth RV number 0 in the CG resource, M being more than or equal to 1.

For example, the target position is the position of the repetition corresponding to the Mth RV number 0 in the CG resource. In such case, the target position may be the position of the repetition corresponding to the first RV number 0 in the CG resource, or the target position may be the position of the repetition corresponding to the jth RV number 0 in the CG resource, j>1, or the target position may be the position of the repetition corresponding to the last RV number 0 in the CG resource.

Optionally, the method further includes the following operations.

The network device performs received data detection on the target position in a first period of the CG resource. Responsive to detecting the data at the target position in the first period, it is determined that the target position is in the first period. Responsive to detecting no received data at the target position in the first period, the network device continues to perform received data detection on the target position in a second period until a period including the target position is determined.

When the terminal device determines the starting position, under the condition that the target position is at or after the arrival time of the data born in the CG resource, the network device is not sure about a period including the target position for transmission of the data, and detects the target position in each period of the CG resource until the period including the target position is determined.

When performing received data detection, the network device judges whether useful information sent by the terminal device is transmitted in the repetition. If the useful information sent by the terminal device is transmitted, determining that the received data is detected, otherwise determining that no received data is detected.

Figure 6:
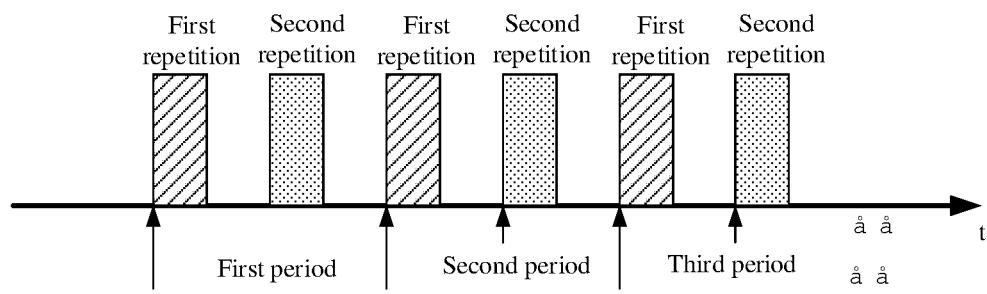
FIG. 6 is an optional schematic diagram of a target position detection effect according to embodiments of the disclosure.

Exemplarily, the CG resource includes two repetitions in each period, as shown in FIG. 6. When the target position is the position of the first repetition, the network device detects the first repetition in a first period to determine whether data is received in the first repetition in the first period, and when the data is received in the first repetition in the first period, determines that the terminal device starts transmitting the data at the position of the first repetition in the first period and the target position is in the first period. When no data is received in the first repetition in the first period, the first repetition in a second period is continued to be detected to determine whether the data is received in the first repetition in the second period, and when the data is received in the first repetition in the second period, it is determined that the terminal device starts transmitting the data at the position of the first repetition in the second period. When no data is received in the first repetition in the second period, the first repetition in a third period is continued to be detected until the period including the target position is determined.

In the embodiments of the disclosure, under the condition that the CG resource available for transmission of the data includes at least two sets and the at least two sets of CG resources have a resource conflict, the method further includes the following operation.

The network device detects the set of CG resource including the target position from the at least two sets of CG resources.

Optionally, the operation that the network device detects the set of CG resource including the target position from the at least two sets of CG resources includes the following operation.

The network device sequentially performs received data detection on the target position in each period of each received set of CG resource until the received data is detected to determine the set of CG resource including the target position.

When the terminal determines the starting position, under the condition that the target position is at or after the arrival time of the data born in the CG resource and a set of CG resource is selected from multiple sets of CG resource that may be configured to transmit the same data and have resource conflicts, the network device is not sure about the set of CG resource including the target position for transmission of the data. In such case, the network device detects the target position in each period of each set of CG resource until the period including the target position is determined.

Figure 7:
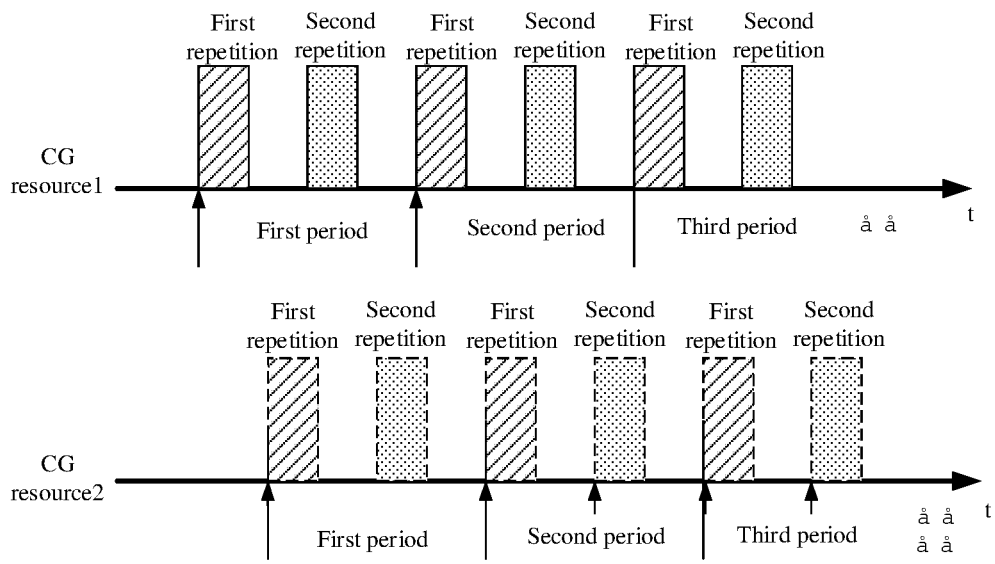
FIG. 7 is an optional schematic diagram of a target position detection effect according to embodiments of the disclosure.

Exemplarily, as shown in FIG. 7, CG resource 1 and CG resource 2 may transmit the same data and have a resource conflict, two repetitions are configured in each of CG resource 1 and CG resource 2, and the target position is the position of the first repetition. The network device detects the first repetition in the first period of CG resource 1. If no data is detected in the first repetition in the first period of CG resource 1, the first repetition in the first period of CG resource 2 is continued to be detected. If no data is detected in the first repetition in the first period of CG resource 2, the first repetition in the second period of CG resource 1 is continued to be detected. If no data is detected in the first repetition in the second period of CG resource 1, the first repetition in the second period of CG resource 2 is continued to be detected until the data is detected.

In S204, the network device starts merging the data transmitted through the CG resource based on the target position.

The network device may execute at least one of the following processing based on the determined target position: receiving a UL resource, decoding a corresponding MAC PDU, storing the received MAC PDU in a Hybrid Automatic Repeat reQuest (HARQ) process, and merging the data on the resource.

Optionally, the terminal device detects the target position in each period of the CG resource before determining the period including the target position, and receives data of each repetition after determining the target position. For example, as shown in FIG. 6, if the network device detects the data in the first repetition in the second period, the data of the first repetition in the second period and each repetition thereafter, including the first repetition in the second period, the second repetition in the second period, the first repetition in the third period, and the second repetition in the third period, etc., is decoded and merged.

Optionally, the terminal device detects the target position in each period of the CG resource before determining the CG resource including the target position, and receives data of each repetition of the CG resource including the target position after determining the target position. For example, as shown in FIG. 7, if the network device detects the data in the first repetition in the second period of CG resource 2, the data of the first repetition in the second period of CG resource 2 and each repetition of CG resource 2 thereafter, including the first repetition in the second period of CG resource 2, the second repetition in the second period of CG resource 2, the first repetition in the third period of CG resource 2, and the second repetition in the third period of CG resource 2, etc., is decoded and merged.

It is to be noted that, in the embodiments of the disclosure, an execution sequence of S202 and S203 is not limited.

In the related art, under the condition of configuring repetition, for each CG resource, multiple positions corresponding to RV 0 may be configured. If resource merging is still started from any one of positions corresponding to RV 0, which may cause such a problem that the terminal device merges other information (i.e., an interference), received at a position where no data is practically transmitted, to a buffer area for practical transmission by the UE to cause reduction in the merging gain and even incorrect decoding of the network device. In addition, the number of times of blind detection performed by a base station may be increased.

In the embodiments of the disclosure, the terminal device determines the target position for starting transmitting the data in one of the following manners: predetermining by the terminal device and the network device, indicating by the network device, or determining by the terminal device and reporting to the network device as required, and then the network device may know the position where the terminal device starts transmitting the data in the CG resource configured with the repetition, so that the problem that the network device merges an interference to a buffer area for practical transmission by the terminal device due to existence of multiple possible resource merging positions, which causes reduction in a merging gain and even incorrect decoding of the network device, is solved, and in addition, the number of times of blind detection performed by the base station and the complexity in processing performed by the base station are reduced.

In addition, in the related art, there may be multiple sets of CG resources available at the same time, and each set of CG resource is configured with a repetition. In such case, when the multiple sets of CG resources conflict, UE is required to select the more appropriate CG resource to ensure a merging gain and transmission reliability. For example, when the CG resource with relatively few left repetition resource positions are selected, the repetition count may be reduced, and furthermore, the transmission reliability may be reduced.

According to the data transmission method provided in the embodiments of the disclosure, when multiple sets of CG resources are configured, and each set of CG resource is configured with a repetition, a set of CG resource is selected, and a starting position for resource merging is determined, namely a first position at or after the arrival time of the data is selected for transmission, the first position being a position of a first repetition resource of the corresponding set of CG resource or a position of a first repetition resource of a closest corresponding set of CG resource.

Through the data transmission method provided in the embodiments of the disclosure, the CG resource with most repetitions may be selected, so that the repetition count is ensured, the reliability is further ensured, and in addition, the problem that the base station merges an interference to a buffer area for practical transmission by the UE due to existence of multiple possible resource merging positions to cause reduction in the merging gain and even incorrect decoding of the base station is solved.

Exemplary descriptions will be made below to the data transmission method provided in the embodiments of the disclosure through different scenarios.

A first scenario: there is no resource conflict.

Figure 8:
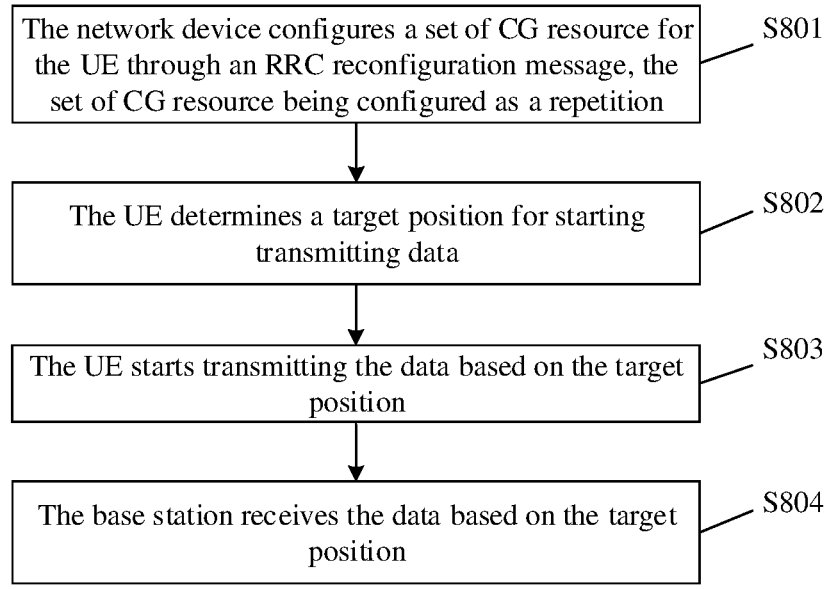
FIG. 8 is an optional schematic processing flowchart of a data transmission method according to embodiments of the disclosure.
Figure 9:
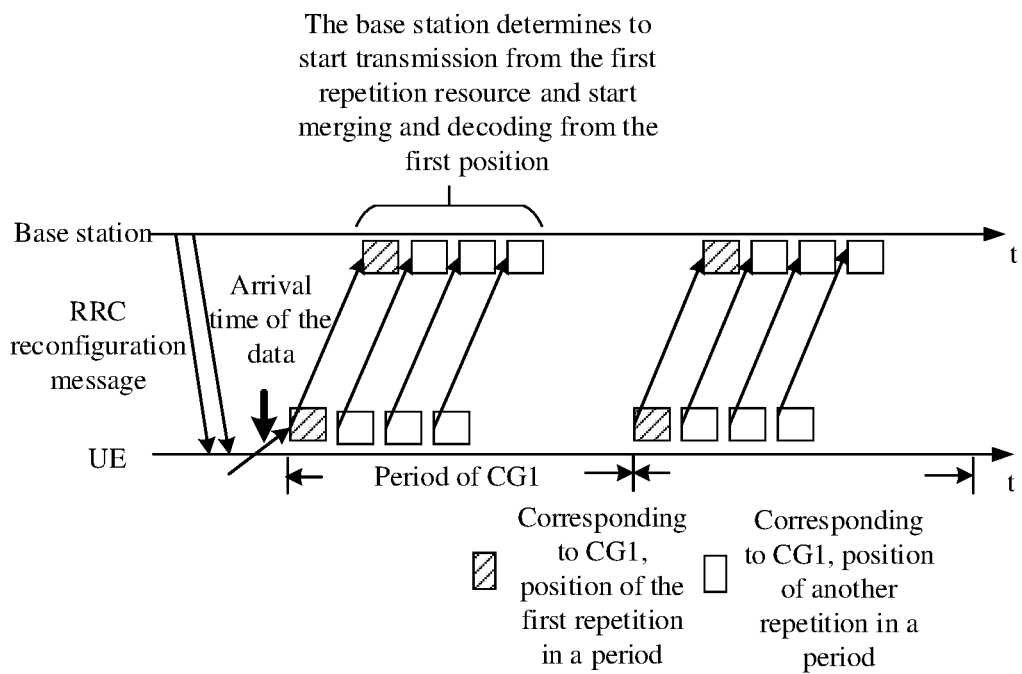
FIG. 9 is an optional schematic diagram of a data transmission effect according to embodiments of the disclosure.

Here, the data transmission method provided in the embodiments of the disclosure is described in combination with FIG. 8 and FIG. 9. As shown in FIG. 8, the following operations are included.

In S801, the network device configures a set of CG resource for the UE through an RRC reconfiguration message, the set of CG resource being configured as a repetition.

An IE for performing configuration of the CG resource is ConfiguredGrantConfig. In configuration of the CG resource, a set of CG resource is configured, and configuration information of the CG resource includes the following.

1) A period, a repetition count repK, and an RV number repK-RV for repetition.
2) N indicating a target position, N being configured to indicate a specific repetition resource to be used by the UE to start transmitting data or a starting position for resource merging performed by the base station.

N indicating the target position may also be contained through another RRC message, or a MAC CE, or DCI indicating CG resource activation/deactivation.

For example, the period of the configured CG is 10 ms, repK is 4, RV numbers repK-RV for repetition are 0, 3, 0, and 3, and the starting position of the CG is 0ms. A type of the CG is type2, namely the DCI is required to instruct the CG to be activated. N=1 is configured to instruct the UE to start transmitting the data from a first repetition.

In S802, the UE determines a target position for starting transmitting data.

The UE receives and stores the configuration information in S801. A type1 CG resource may be used when configured. For a type2 CG resource, the UE may start using the resource after receiving an activation instruction indicated by the DCI.

For example, the DCI indicates that a frequency-domain position of the CG resource is DRB1-2, and a Physical Uplink Shared Channel (PUSCH) duration is 1symbol. Since the starting position is 0ms, and the repetition count is 4, exemplarily, the following positions of the CG resources are included.

1) Four positions of the first CG resource are a first symbol of slot 0 of radio frame 0, a first symbol of slot 1 of radio frame 0, a first symbol of slot 2 of radio frame 0, and a first symbol of slot 3 of radio frame 0.
2) Four positions of the second CG resource are a first symbol of slot 0 of radio frame 1, a first symbol of slot 1 of radio frame 1, a first symbol of slot 2 of radio frame 1, and a first symbol of slot 3 of radio frame 1.
3) Positions of the other CG resources are deduced by analogy.

In S803, the UE starts transmitting the data based on the target position.

For the configured CG resource, the UE starts transmitting the data based on the target position, the target position being a position of one repetition in the CG resource configured with the repetition. The target position may be predefined, predetermined with the network device, or indicated by the network device.

The target position may specifically be one of the following.

a: The position of the first repetition of the CG resource.
b: A position of an ith repetition of the CG resource, i>1.
c: A position corresponding to the first RV 0 in the CG resource.
d: A position corresponding to the last RV 0 in the CG resource.
c: A position corresponding to the jth RV 0 in the CG resource, j>1.
f: A resource position corresponding to any one RV 0 in the CG resource.

Under one condition, for the configured CG resource, the UE starts transmitting the data based on the target position.

For example, the target position is the position of the first repetition of the CG resource. In such case, a MAC PDU is started to be transmitted using the CG resource from the first symbol of slot 0 of radio frame 0. Correspondingly, the base station starts receiving the data and/or merging the data on the resource from the first symbol of slot 0 of radio frame 0.

For another example, the target position is the position of the repetition corresponding to the first RV 0 in the CG resource. In such case, a position of the first symbol of slot 0 of radio frame 0 corresponds to RV=0, and the MAC PDU is started to be transmitted using the CG from the first symbol of slot 0 of radio frame 0. Correspondingly, the base station starts receiving the data and/or merging the data on the resource from the first symbol of slot 0 of radio frame 0.

Under another condition, the UE starts transmitting the data based on the target position after arrival of a service. In such case, the target position is a position when or after a local channel that may be transmitted on the CG resource has data to be transmitted.

For example, the target position is the position of the first repetition of the CG resource. Since the data of the logical channel that may be transmitted on the CG resource arrives after the position of the first repetition resource, the data is transmitted at a position of a first repetition resource of a next CG. The data of the logical channel transmitted on the CG resource arrives at the third symbol of slot 0 of radio frame 0, and the MAC PDU is started to be transmitted using the CG resource from the first symbol of slot 0 of radio frame 1. Correspondingly, the base station starts receiving the data and/or merging the data on the resource from the first symbol of slot 0 of radio frame 1.

For another example, the target position is the position of the repetition resource corresponding to the first RV 0 in the CG resource. Since the data of the logical channel that may be transmitted on the CG resource arrives after the position of the repetition resource corresponding to the first RV 0, the data is transmitted at the position of the first repetition resource of the CG resource of a next period. The position of the first symbol of slot 0 of radio frame 0 corresponds to RV=0, the data of the logical channel transmitted on the CG resource arrives at the third symbol of slot 0 of radio frame 0, and the MAC PDU is started to be transmitted using the CG resource from the first symbol of slot 0 of radio frame 1. Correspondingly, the base station starts receiving the data and/or merging the data on the resource from the first symbol of slot 0 of radio frame 1.

In S804, the base station receives the data based on the target position.

For the configured CG resource, the base station performs reception of the data. The base station executes at least one of the following operations based on the target position.

a: Receiving a UL resource.
b: Decoding a corresponding MAC PDU.

c: Storing the received MAC PDU in a HARQ process.

d: Merging the data on the resource.

In the first scenario, according to the embodiments of the disclosure, the problem that the base station merges an interference to a buffer area for practical transmission by the UE due to existence of multiple possible resource merging positions to cause reduction in a merging gain and even incorrect decoding of the base station is solved.

A second scenario: there is a resource conflict.

Figure 10:
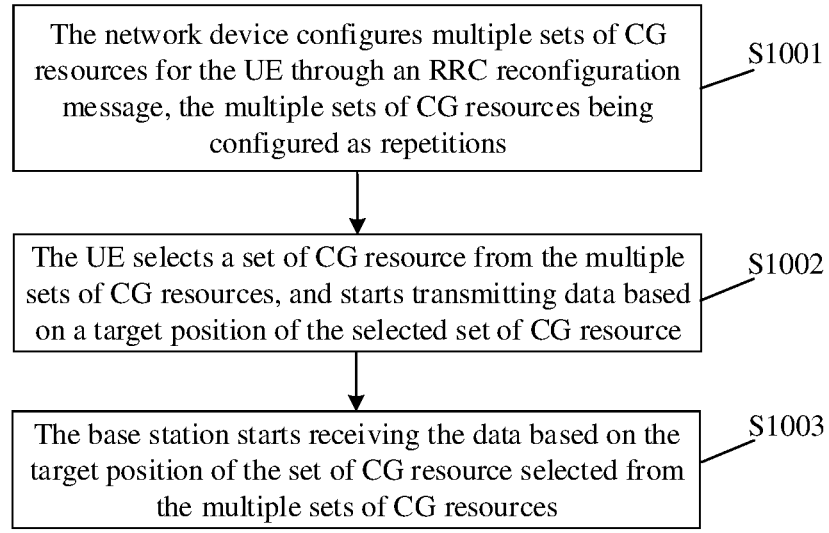
FIG. 10 is an optional schematic processing flowchart of a data transmission method according to embodiments of the disclosure.
Figure 11:
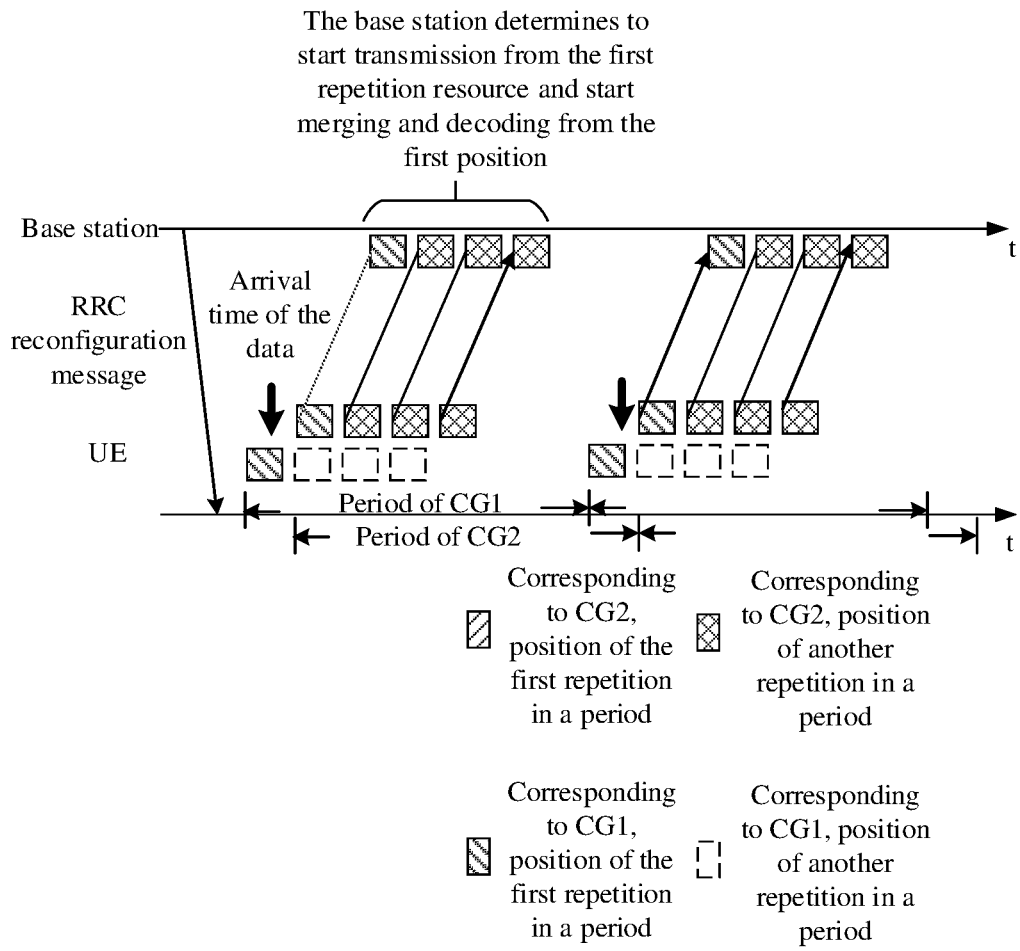
FIG. 11 is an optional schematic diagram of a data transmission effect according to embodiments of the disclosure.

Here, the data transmission method provided in the embodiments of the disclosure is described in combination with FIG. 10 and FIG. 11. As shown in FIG. 11, the following operations are included.

In S1001, the network device configures multiple sets of CG resources for the UE through an RRC reconfiguration message, the multiple sets of CG resources being configured as repetitions.

The network device configures the multiple sets of CG resources for the UE through the RRC reconfiguration message, each set of CG resource being configured as a repetition. Here, the second scenario is described by taking the condition that the multiple sets of CG resources are two sets of CG resources as an example.

If at least part of CG resources in the configured two sets of CG resources meet the following condition, it is determined that the two sets of CG resources have a resource conflict.

A first condition: at least part of CG resources may be configured to transmit the same data.

A second condition: at least part of CG resources overlap in a time domain.

Taking two sets of CG resources as an example, if the two sets of CG resources may transmit the same logical channel or service, or priorities of the two CG resources are the same, it is determined that the two sets of CG resources may be configured to transmit the same data.

Taking two sets of CG resources as an example, that the two sets of CG resources overlap in the time domain may be as follows.

The two sets of CG resources are different in period but overlap in part of time-domain configurations, or the two sets of CG resources are the same in configuration and different only in resource starting position.

For example, resource types of the configured two sets of CG resources, i.e., CG resource 1 and CG resource 2, are type1, the resources are not required to be activated using DCI, and all information is in RRC configurations.

For CG resource 1, a period is 10 ms, a starting position is 0 ms, repK is 4, and repK-RVs are 0, 3, 0, and 3. A frequency-domain position is DRB1-2, and a PUSCH duration is 1 symbol. The following positions are included.

1) Four resource positions of the first CG resource are a first symbol of slot 0 of radio frame 0, a first symbol of slot 1 of radio frame 0, a first symbol of slot 2 of radio frame 0, and a first symbol of slot 3 of radio frame 0.

2) Four resource positions of the second CG resource are a first symbol of slot 0 of radio frame 1, a first symbol of slot 1 of radio frame 1, a first symbol of slot 2 of radio frame 1, and a first symbol of slot 3 of radio frame 1.

For CG resource 2, a period is 10 ms, a starting position is slot 1 of radio frame 0, repK is 4, and repK-RVs are 0, 3, 0, and 3. A frequency-domain position is DRB3-4, and a PUSCH duration is 1 symbol. The following positions are included.

1) Four resource positions of the first CG resource are the first symbol of slot 1 of radio frame 0, the first symbol of slot 2 of radio frame 0, the first symbol of slot 3 of radio frame 0, and a first symbol of slot 4 of radio frame 0.

2) Four resource positions of the second CG resource are the first symbol of slot 1 of radio frame 1, the first symbol of slot 2 of radio frame 1, the first symbol of slot 3 of radio frame 1, and a first symbol of slot 4 of radio frame 1.

In S1002, the UE selects a set of CG resource from the multiple sets of CG resources, and starts transmitting data based on a target position of the selected set of CG resource.

The UE receives configuration information in S1001, and starts using the resource when a logical channel that may be born in the CG resource has data to be transmitted.

Since the multiple sets of CG resources conflict, the UE selects the CG resource used for data transmission and determines the target position on the selected CG transmission resource.

The UE starts transmitting the data using the target position. The selected CG resource may be determined according to at least one of the following factors, and the target position selected for transmission using the CG resource may also be determined.

A first factor: arrival time of the data to be transmitted of the logical channel that may be born in the CG resource.

A second factor: time of a first repetition resource of each set of CG resource, or, a first position corresponding to RV=0, or any position corresponding to RV=0.

The CG resource selected by the UE and the determined target position include one of the following conditions.

a) After the arrival time of the data of the logical channel, a set of CG resource includes a first repetition resource, and the target position is a position of the first repetition resource of the CG;

b) After the arrival time of the data of the logical channel, a set of CG resource includes most repetition resources, and the target position is a position of a first repetition resource of the CG;

c) After the arrival time of the data of the logical channel, a set of CG resource having any one resource corresponding to RV 0, and the target position is any one position corresponding to RV=0 in the CG; or d) After the arrival time of the data of the logical channel, a set of CG resource having a first resource corresponding to RV 0, and the target position is a first position corresponding to RV=0 in the CG.

That is, the UE selects to perform transmission using a CG resource including a first repetition resource or a CG resource including most left repetition resources after first time. The target time is time when or after the logical channel transmitted on the CG resource has the data to be transmitted.

For example, CG resource 1 and CG resource 2 conflict, the data of the logical channel may be transmitted on the CG resource arrives at a tenth symbol of slot 0 of radio frame 0, the first symbol of slot 1 of radio frame 0 includes a second repetition resource of CG resource 1 and a first repetition resource of CG resource 2, and the UE selects a CG resource including a first repetition for transmission. Therefore, the UE selects CG resource 2, and starts transmitting the MAC PDU from a position of the first repetition of CG resource 2 (the first symbol of slot 1 of radio frame 0). Correspondingly, the base station starts receiving the data and/or merging the data on the resource from the position of the first repetition of CG resource 2.

For another example, CG resource 1 and CG resource 2 conflict, the data of the logical channel may be transmitted on the CG resource arrives at a tenth symbol of slot 1 of radio frame 0, the first symbol of slot 2 of radio frame 0 includes a third repetition resource of CG resource 1 and a second repetition resource of CG resource 2, there is no corresponding set of CG resource including a first repetition resource, and the UE selects the closest set of CG resource including the first repetition resource for transmission. The closest CG is CG resource 1, and the corresponding target position is the first symbol of slot 1 of radio frame 1. Therefore, the UE selects CG resource 1, and starts transmitting the MAC PDU from a position of the first repetition resource of CG resource 1 (the first symbol of slot 1 of radio frame 1). Correspondingly, the base station starts receiving the data and/or merging the data on the resource from this position.

In S1003, the base station starts receiving the data based on the target position of the set of CG resource selected from the multiple sets of CG resources.

For the configured CG resource, the base station performs reception of the data. Specifically, the base station executes at least one of the following operations based on the target position.
  a: Receiving a UL resource.
  b: Decoding a corresponding MAC PDU.
  c: Storing the received MAC PDU in a HARQ process.
  d: Merging the data on the resource.

In the second scenario, according to the embodiments of the disclosure, the CG resource with most repetition resources is selected, so that the repetition count is ensured, the reliability is further ensured, and in addition, the problem that the base station merges an interference to a buffer area for practical transmission by the UE due to existence of multiple possible resource merging positions, which causes reduction in a merging gain and even incorrect decoding of the base station, is solved.

Figure 12:
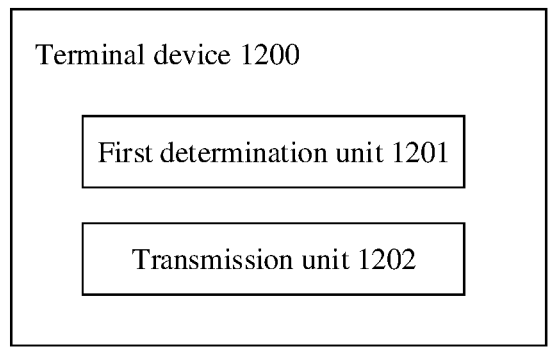
FIG. 12 is a composition structure diagram of a terminal device according to embodiments of the disclosure.

For implementing the data processing method, the embodiments of the disclosure also provide a terminal device. A composition structure of the terminal device is shown in FIG. 12. The terminal device 1200 includes a first determination unit 1201 and a transmission unit 1202.

The first determination unit 1201 is configured to determine a target position according to repetition positions of a CG resource configured with a repetition.

The transmission unit 1202 is configured to start transmitting based on the target position.

A determination manner for the target position includes one of following: predetermining by the terminal device and a network device; indicating by the network device; or determining by the terminal device. Under the condition that the determination manner is determining by the terminal device, the terminal device reports the target position to the network device.

In the embodiments of the disclosure, the target position includes one of the following: a position of an Nth repetition of the CG resource, N being more than or equal to 1; or a position of an Mth repetition corresponding to RV number 0 in the CG resource, M being more than or equal to 1.

In the embodiment of the disclosure, under the condition that the target position is the position of the repetition corresponding to the Mth RV number 0 in the CG resource, the target position is a position of a repetition corresponding to the first RV number 0 in the CG resource; or the target position is a position of a repetition corresponding to the last RV number 0 in the CG resource.

In the embodiments of the disclosure, the target position is at or after an arrival time of the data born in the CG resource.

In the embodiments of the disclosure, the terminal device further includes a selection unit.

The selection unit is configured to, under the condition that a CG resource available for transmission of the data includes at least two sets and the at least two sets of CG resources have a resource conflict, select a set of CG resource from the at least two sets of CG resources.

The first determination unit is configured to determine the target position from repetition positions of the selected set of CG resource.

In the embodiments of the disclosure, that the at least two sets of CG resources have the resource conflict includes that the at least two sets of CG resources overlap in a time domain.

In the embodiment of the disclosure, a selection factor for selecting a set of CG resource from the at least two sets of CG resources includes at least one of the following: the arrival time of the data born in the at least two sets of CG resources; and the target position of each set of CG resource.

In the embodiments of the disclosure, a selection rule for selecting a set of CG resource from the at least two sets of CG resources includes one of the following: selecting a first set of CG resource with the target position after the arrival time of the data born in the at least two sets of CG resources; or selecting a set of CG resource with a largest count of repetition after the arrival time of the data born in the at least two sets of CG resources.

The embodiments of the disclosure also provide a terminal device, which includes a processor and a memory configured to store a computer program capable of running in the processor, the processor being configured to run the computer program to execute the operations of the data transmission method executed by the terminal device.

Figure 13:
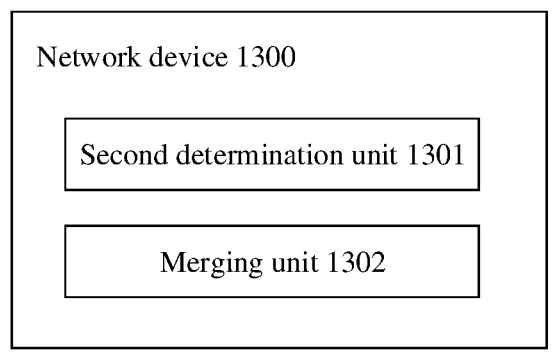
FIG. 13 is a composition structure diagram of a network device according to embodiments of the disclosure.

For implementing the data processing method, the embodiments of the disclosure also provide a network device. A composition structure of the network device is shown in FIG. 13. The network device 1300 includes a second determination unit 1301 and a merging unit 1302.

The second determination unit 1301 is configured to determine a target position according to repetition positions of a CG resource configured with a repetition.

The merging unit 1302 is configured to start merging data transmitted through the CG resource based on the target position.

A determination manner for the target position includes one of the following: predetermining by a terminal device and the network device; determining by the network device; or reporting by the terminal device. Under the condition that the determination manner is determining by the network device, the network device indicates the target position to the terminal device.

In the embodiments of the disclosure, the target position includes one of the following: a position of an Nth repetition of the CG resource, N being greater than or equal to 1; or a position of a repetition corresponding to the Mth RV number 0 in the CG resource, M being greater than or equal to 1.

In the embodiments of the disclosure, under the condition that the target position is the position of the repetition corresponding to the Mth RV number 0 in the CG resource, the target position is a position of a repetition corresponding to the first RV number 0 in the CG resource; or the target position is a position of a repetition corresponding to the last RV number 0 in the CG resource.

In the embodiments of the disclosure, the network device further includes a first detection unit.

The first detection unit is configured to: perform received data detection on the target position in a first period of the CG resource; responsive to detecting the data at the target position in the first period, determine that the target position is in the first period; and responsive to detecting no received data at the target position in the first period, continue to perform received data detection on the target position in a second period until a period including the target position is determined.

In the embodiments of the disclosure, the network device further includes a second detection unit, configured to: under the condition that a CG resource available for transmission of the data includes at least two sets and the at least two sets of CG resources have a resource conflict, detect the set of CG resource including the target position from the at least two sets of CG resources.

In the embodiments of the disclosure, that the at least two sets of CG resources have the resource conflict includes that the at least two sets of CG resources have overlap in a time domain.

In the embodiments of the disclosure, the second detection unit is further configured to: sequentially perform received data detection on the target position in each period of each received set of CG resource, and when the received data is detected, determine the set of CG resource including the target position.

The embodiments of the disclosure also provide a network device, which includes a processor and a memory configured to store a computer program capable of running in the processor, the processor being configured to run the computer program to execute the operations of the data transmission method executed by the network device.

Figure 14:
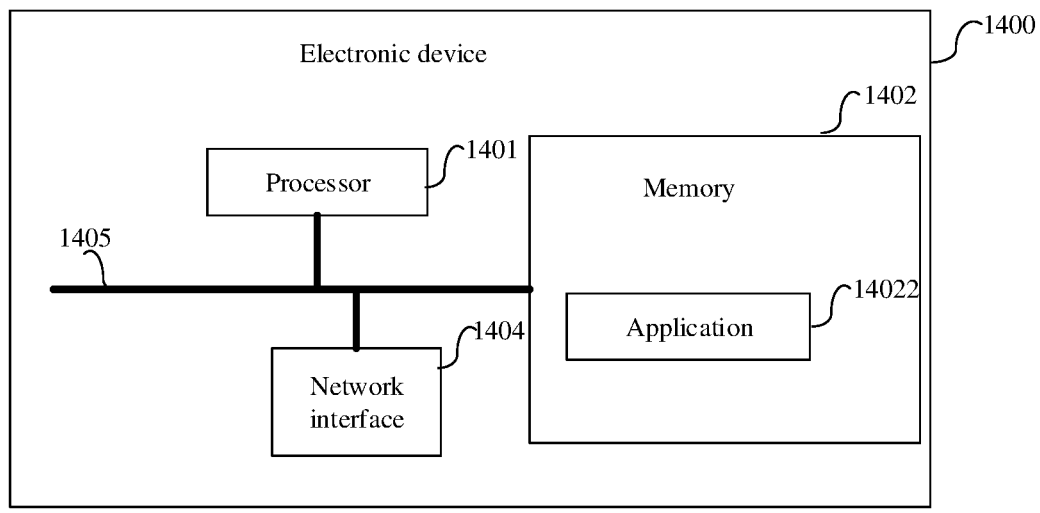
FIG. 14 is a hardware composition structure diagram of an electronic device according to embodiments of the disclosure.

FIG. 14 is a hardware composition structure diagram of an electronic device (a terminal device or a network device) according to embodiments of the disclosure. The electronic device 1400 includes at least one processor 1401, a memory 1402, and at least one network interface 1404. Each component in the terminal device 1400 is coupled together through a bus system 1405. It can be understood that the bus system 1405 is configured to implement connection communication between these components. The bus system 1405 includes a data bus, and further includes a power bus, a control bus, and a state signal bus. However, for clear description, various buses in FIG. 14 are marked as the bus system 1405.

It can be understood that the memory 1402 may be a volatile memory or a nonvolatile memory, and may also include both the volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, a compact disc, or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory 1402 described in the embodiments of the disclosure is intended to include, but not limited to, memories of these and any other proper types.

In the embodiments of the disclosure, the memory 1402 is configured to store various types of data to support the operation of the terminal device 1400. Examples of the data include any computer program, for example, an application 14022, operated in the electronic device 1400. A program implementing the method of the embodiments of the disclosure may be included in the application 14022.

The method disclosed in the embodiments of the disclosure may be applied to the processor 1401 or implemented by the processor 1401. The processor 1401 may be an integrated circuit chip with a signal processing capability. In an implementation process, each step of the method may be completed by an integrated logic circuit of hardware in the processor 1401 or an instruction in a software form. The processor 1401 may be a universal processor, a Digital Signal Processor (DSP) or another Programmable Logic Device (PLD), a discrete gate or transistor logic device, a discrete hardware component, etc. The processor 1401 may implement or execute each method, operation and logical block diagram disclosed in the embodiments of the disclosure. The universal processor may be a microprocessor, any conventional processor, etc. The operations of the method disclosed in combination with the embodiments of the disclosure may be directly embodied to be executed and completed by a hardware decoding processor or executed and completed by a combination of hardware and software modules in the decoding processor. The software module may be in a storage medium, and the storage medium is in the memory 1402. The processor 1401 reads information in the memory 1402 and completes the operations of the method in combination with hardware.

In an exemplary embodiment, the electronic device 1400 may be implemented by one or more Application Specific Integrated Circuits (ASICs), DSPs, PLDs, Complex Programmable Logic Devices (CPLDs), Field Programmable Gate Arrays (FPGAs), universal processors, controllers, Micro Controller Units (MCUs), Microprocessor Units (MPUs), or other electronic components, and is configured to execute the abovementioned method.

The embodiments of the disclosure also provide a storage medium, which is configured to store a computer program.

Optionally, the storage medium may be applied to a terminal device in the embodiments of the disclosure, and the computer program enables a computer to execute corresponding flows in each method of the embodiments of the disclosure. For simplicity, elaborations are omitted herein.

Optionally, the storage medium may be applied to a network device in the embodiments of the disclosure, and the computer program enables a computer to execute corresponding flows in each method of the embodiments of the disclosure. For simplicity, elaborations are omitted herein.

The disclosure is described with reference to flowcharts and/or block diagrams of the method, device (system), and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor, or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

The above is only the preferred embodiment of the disclosure and not intended to limit the scope of protection of the disclosure. Any modifications, equivalent replacements, improvements, etc., made within the spirit and principle of the disclosure shall fall within the scope of protection of the disclosure.

The invention claimed is:

1. A data transmission method, comprising:
   determining, by a terminal device, a target position according to repetition positions of a Configured Grant (CG) resource configured with a repetition; and
   starting transmitting, by the terminal device, data based on the target position,
   wherein the target position is a position of a repetition corresponding to a first Redundancy Version (RV) number 0 in the CG resource, and the target position is determined by a network device and is indicated through indication information by the network device to the terminal device, wherein the CG resource comprises multiple repetition positions corresponding to a RV number 0,
   under a condition that the CG resource available for transmission of the data comprises at least two sets and the at least two sets of CG resources have overlap in a time domain, wherein the method further comprises:
   selecting, by the terminal device, a set of CG resource from the at least two sets of CG resources,
   wherein determining, by the terminal device, the target position according to the repetition positions of the CG resource configured with the repetition comprises:
   determining, by the terminal device, the target position from repetition positions of the selected set of CG resource.

2. The method of claim 1, wherein the target position is at or after an arrival time of data born in the CG resource.

3. The method of claim 1, wherein a selection factor for selecting the set of CG resource from the at least two sets of CG resources comprises at least one of following:
   the arrival time of the data born in the at least two sets of CG resources; and
   the target position of each set of CG resource.

4. The method of claim 1, wherein a selection rule for selecting the set of CG resource from the at least two sets of CG resources comprises one of following:
   selecting a first set of CG resource with the target position after the arrival time of the data born in the at least two sets of CG resources; or
   selecting a set of CG resource with a largest count of repetition after the arrival time of the data born in the at least two sets of CG resources.

5. A terminal device, comprising a processor and a memory configured to store a computer program capable of running in the processor, wherein the processor is configured to run the computer program to:
   determine a target position according to repetition positions of a Configured Grant (CG) resource configured with a repetition; and
   start transmitting based on the target position,
   wherein the target position is a position of a repetition corresponding to a first Redundancy Version (RV) number 0 in the CG resource, and the target position is determined by a network device and is indicated through indication information by the network device to the terminal device, wherein the CG resource comprises multiple repetition positions corresponding to a RV number 0,
   wherein the processor is further configured to run the computer program to:
   under a condition that a CG resource available for transmission of the data comprises at least two sets and the at least two sets of CG resources have overlap in a time domain, select a set of CG resource from the at least two sets of CG resources; and
   determine the target position from repetition positions of the selected set of CG resource.

6. The terminal device of claim 5, wherein the target position is at or after an arrival time of data born in the CG resource.

7. The terminal device of claim 5, wherein a selection factor for selecting a set of CG resource from the at least two sets of CG resources comprises at least one of following:
   the arrival time of the data born in the at least two sets of CG resources; and
   the target position of each set of CG resource.

8. The terminal device of claim 5, wherein a selection rule for selecting the set of CG resource from the at least two sets of CG resources comprises one of following:
   selecting a first set of CG resource with the target position after the arrival time of the data born in the at least two sets of CG resources; or
   selecting a set of CG resource with a largest count of repetition after the arrival time of the data born in the at least two sets of CG resources.

9. A network device, comprising a processor and a memory configured to store a computer program capable of running in the processor, wherein the processor is configured to run the computer program to:
   determine a target position according to repetition positions of a Configured Grant (CG) resource configured with a repetition; and
   start merging data transmitted through the CG resource based on the target position,
   wherein the target position is a position of a repetition corresponding to a first Redundancy Version (RV) number 0 in the CG resource, and the target position is determined by the network device and is indicated through indication information by the network device to the terminal device, wherein the CG resource comprises multiple repetition positions corresponding to a RV number 0, wherein the processor is further configured to run the computer program to:

under a condition that a CG resource available for transmission of the data comprises at least two sets and the at least two sets of CG resources have overlap in a time domain, detect the set of CG resource comprising the target position from the at least two sets of CG resources.

10. The network device of claim 9, wherein the processor is further configured to run the computer program to:

perform received data detection on the target position in a first period of the CG resource;

responsive to detecting data at the target position in the first period, determine that the target position is in the first period; and responsive to detecting no received data at the target position in the first period, continue to perform received data detection on the target position in a second period until a period comprising the target position is determined.

11. The network device of claim 10, wherein the processor is further configured to run the computer program to:

sequentially perform received data detection on the target position in each period of each received set of CG resource, and when received data is detected, determine the set of CG resource comprising the target position.

* * * * *